(12) United States Patent
Blakeslee

(10) Patent No.: US 9,924,310 B2
(45) Date of Patent: Mar. 20, 2018

(54) LOCATION-DRIVEN SOCIAL NETWORKING SYSTEM AND METHOD

(71) Applicant: Matthew A. Blakeslee, Webster, NY (US)

(72) Inventor: Matthew A. Blakeslee, Webster, NY (US)

( * ) Notice: Subject to any disclaimer, the term of this patent is extended or adjusted under 35 U.S.C. 154(b) by 12 days.

(21) Appl. No.: 15/192,428

(22) Filed: Jun. 24, 2016

(65) Prior Publication Data

US 2017/0374505 A1     Dec. 28, 2017

(51) Int. Cl.
*H04W 24/00* (2009.01)
*H04W 4/02* (2018.01)
*H04L 29/08* (2006.01)

(52) U.S. Cl.
CPC ............ *H04W 4/021* (2013.01); *H04L 67/10* (2013.01); *H04L 67/18* (2013.01)

(58) Field of Classification Search
CPC .................................................... H04W 4/021
USPC .............................. 455/457, 414.1; 709/206
See application file for complete search history.

(56) References Cited

U.S. PATENT DOCUMENTS

| | | | |
|---|---|---|---|
| 8,229,458 B2 | 7/2012 | Busch | |
| 8,930,162 B2 | 1/2015 | Wang et al. | |
| 9,129,333 B2 | 9/2015 | Hardie et al. | |
| 9,294,428 B2 | 3/2016 | Nordstrom et al. | |
| 2008/0070550 A1 | 3/2008 | Hose | |
| 2010/0145947 A1 | 6/2010 | Kolman et al. | |
| 2011/0099037 A1 | 4/2011 | Levin et al. | |
| 2012/0151413 A1 | 6/2012 | Nurmi et al. | |
| 2012/0252418 A1* | 10/2012 | Kandekar | H04W 4/021 455/414.1 |
| 2012/0290977 A1 | 11/2012 | Devecka | |
| 2013/0066986 A1* | 3/2013 | DiCosola | G06Q 10/10 709/206 |
| 2015/0019651 A1 | 1/2015 | Kazi et al. | |
| 2015/0058957 A1 | 2/2015 | Halliday et al. | |
| 2015/0289093 A1 | 10/2015 | Petty et al. | |
| 2016/0021153 A1 | 1/2016 | Hull et al. | |

FOREIGN PATENT DOCUMENTS

WO     WO 2006005122     1/2006

\* cited by examiner

*Primary Examiner* — Charles Shedrick
(74) *Attorney, Agent, or Firm* — Heslin Rothenberg Farley & Mesiti P.C.

(57) ABSTRACT

One or more processors generate a graphical user interface, on a client computing node, and communicate with the client computing node via an Internet connection. The processor(s) obtains user data from a client, where the user data includes attributes of the user and privacy selections related to the attributes. The processor(s) utilizes location services in the client computing node to obtain location information from the client computing node indicating a position of the client computing node. The processor(s) determines a geographic segment for the client computing node that represents a pre-defined geographic area that includes the position of the client computing node. The processor(s) displays in the graphical user interface, based on the attributes of the user and the assigned geographic segment, a portion of attributes associated with at least one other user, where the at least one other user is associated with the geographic segment.

20 Claims, 22 Drawing Sheets

300

310

One or more programs generate a graphical user interface (GUI) on a display of a computing node utilized by a user to solicit a registration from the user and obtains registration information from the user.

320

One or more programs utilize the location services in a computing device utilized by the user to determine a location of the user.

330

One or more programs enable the user to configure parameters related to the user's profile that the program code will utilize to determine what information to display to the user.

340

One or more programs assign the user to a pre-defined geographic segment.

350

Based on the assigned segment, one or more programs displays a list of geographical segments to a user and obtains from the user a selection of those segments.

360

One or more programs aggregate and display information related to users fitting the geographic segments selected to the user.

FIG. 3

Street Companies Section (Fill in information during completing your Street Profile)

My Company Name: click here    Choose: ☑ Make Public  or  ☐ Remain Anonymous    edit My Company Title: click here    Choose: ☑ Make Public  or  ☐ Remain Anonymous    edit My Company Description: click here    Choose: ☑ Make Public  or  ☐ Remain Anonymous    edit My Company Website: click here    Choose: ☑ Make Public  or  ☐ Remain Anonymous    edit My Company Industry: click here (dropdown)    Choose: ☑ Make Public  or  ☐ Remain Anonymous    edit Allow users to inbox you about your Street Company: click here    Choose: ☑ Yes  or  ☐ No    edit

FIG. 5A

Street Demographics Section (Fill in information during completing your Street Profile)

☐ Single ☐ 2-Person ☑ Family  Choose: ☑ Make Public  or  ☐ Remain Anonymous   edit Allow users to Inbox you about your Demographics: click here   Choose: ☑ Yes  or  ☐ No   edit PETS:  ☑ Dog(s) ☐ Cat(s) ☐ Bird(s) ☐ Fish ☐ Other (insert)  Choose: ☑ Make Public or ☐ Remain Anonymous   edit Allow users to Inbox you about your Pets: click here   Choose: ☑ Yes  or  ☐ No   edit Length of Time on Street: ☐ Less than 1 Year ☐ 1-5 Years ☑ 5-10 Years ☐ 10+ Years  Choose: ☑ Make Public or ☐ Remain Anonymous   edit Allow users to Inbox you about your Length of Time on Street: click here   Choose: ☑ Yes  or  ☐ No   edit

FIG. 5B

Street Interests Section (Fill in information during completing your Street Profile)

Allow users to inbox you about your Street Interests: click here   Choose: ☑ Yes  or  ☐ No   edit

---

I am interested in:

Garage Sales: click here   Choose: ☑ Yes  or  ☐ No   edit  Choose: ☑ Make Public  or  ☐ Remain Anonymous   edit Allow users to inbox you about Garage Sales: click here   Choose: ☑ Yes  or  ☐ No   edit Estate Sales: click here   Choose: ☑ Yes  or  ☐ No   edit  Choose: ☑ Make Public  or  ☐ Remain Anonymous   edit Allow users to inbox you about Estate Sales: click here   Choose: ☑ Yes  or  ☐ No   edit Home & Garden: click here   Choose: ☑ Yes  or  ☐ No   Choose: ☑ Make Public  or  ☐ Remain Anonymous   edit Allow users to inbox you about Home & Garden: click here   Choose: ☑ Yes  or  ☐ No   edit

FIG. 5C

Neighborhood Watch: click here    Choose: ☑ Yes or ☐ No    Choose: ☑ Make Public or ☐ Remain Anonymous    edit Allow users to Inbox you about Neighborhood Watch: click here    Choose: ☑ Yes or ☐ No    edit Neighborhood Fundraisers: click here    Choose: ☑ Yes or ☐ No    Choose: ☑ Make Public or ☐ Remain Anonymous    edit Allow users to Inbox you about your Neighborhood Fundraisers: click here    Choose: ☑ Yes or ☐ No    edit Neighborhood Networking Events: click here    Choose: ☑ Yes or ☐ No    Choose: ☑ Make Public or ☐ Remain Anonymous    edit Allow users to Inbox you about Neighborhood Networking Events: click here    Choose: ☑ Yes or ☐ No    edit Cooking/Baking/Grilling: click here    Choose: ☑ Yes or ☐ No    Choose: ☑ Make Public or ☐ Remain Anonymous    edit Allow users to Inbox you about Cooking/Baking/Grilling: click here    Choose: ☑ Yes or ☐ No    edit Sports: click here (drop down w/several sports)    Choose: ☑ Yes or ☐ No    Choose: ☑ Make Public or ☐ Remain Anonymous    edit Allow users to Inbox you about Sports: click here    Choose: ☑ Yes or ☐ No    edit Neighborhood Happy Hour: click here    Choose: ☑ Yes or ☐ No    Choose: ☑ Make Public or ☐ Remain Anonymous    edit Allow users to Inbox you about Neighborhood Happy Hour: click here    Choose: ☑ Yes or ☐ No    edit

FIG. 5D

Music/Entertainment: click here   Choose: ☑ Yes  or  ☐ No   Choose: ☑ Make Public  or  ☐ Remain Anonymous   edit Allow users to Inbox you about Music/ Entertainment: click here   Choose: ☑ Yes  or  ☐ No   edit Reading/Writing: click here   Choose: ☑ Yes  or  ☐ No   Choose: ☑ Make Public  or  ☐ Remain Anonymous   edit Allow users to Inbox you about Reading/Writing: click here   Choose: ☑ Yes  or  ☐ No   edit Exercise/Fitness: click here   Choose: ☑ Yes  or  ☐ No   Choose: ☑ Make Public  or  ☐ Remain Anonymous   edit Allow users to Inbox you about Exercise/Fitness: click here   Choose: ☑ Yes  or  ☐ No   edit Landscaping Services: click here   Choose: ☑ Yes  or  ☐ No   Choose: ☑ Make Public  or  ☐ Remain Anonymous   edit Allow users to Inbox you about Landscaping Services: click here   Choose: ☑ Yes  or  ☐ No   edit Driveway Sealing: click here   Choose: ☑ Yes  or  ☐ No   Choose: ☑ Make Public  or  ☐ Remain Anonymous   edit Allow users to Inbox you about Driveway Sealing: click here   Choose: ☑ Yes  or  ☐ No   edit Snow Plowing: click here   Choose: ☑ Yes  or  ☐ No   Choose: ☑ Make Public  or  ☐ Remain Anonymous   edit Allow users to Inbox you about Snow Plowing: click here   Choose: ☑ Yes  or  ☐ No   edit Beer/Wine/Liquor: click here   Choose: ☑ Yes  or  ☐ No   Choose: ☑ Make Public  or  ☐ Remain Anonymous   edit

FIG. 5E

Allow users to Inbox you about Beer/Wine/Liquor: click here   Choose: ☑ Yes or ☐ No   edit Pet Networking: click here   Choose: ☑ Yes or ☐ No   Choose: ☑ Make Public or ☐ Remain Anonymous   edit Allow users to Inbox you about Pet Networking: click here   Choose: ☑ Yes or ☐ No   edit Food/Restaurant: click here   Choose: ☑ Yes or ☐ No   Choose: ☑ Make Public or ☐ Remain Anonymous Allow users to Inbox you about Food/Restaurant: click here   Choose: ☑ Yes or ☐ No   edit Real Estate: click here   Choose: ☑ Yes or ☐ No   Choose: ☑ Make Public or ☐ Remain Anonymous Allow users to Inbox you about Real Estate: click here   Choose: ☑ Yes or ☐ No   edit Town & Community Information: click here   Choose: ☑ Yes or ☐ No   Choose: ☑ Make Public or ☐ Remain Anonymous Allow users to Inbox you about Town & Community Information: click here   Choose: ☑ Yes or ☐ No   edit Exterminator Information: click here   Choose: ☑ Yes or ☐ No   Choose: ☑ Make Public or ☐ Remain Anonymous Allow users to Inbox you about Exterminator Information: click here   Choose: ☑ Yes or ☐ No   edit Computers/Electronics: click here   Choose: ☑ Yes or ☐ No   Choose: ☑ Make Public or ☐ Remain Anonymous

FIG. 5F

Allow users to Inbox you about Computers/Electronics: click here    Choose: ☑ Yes  or  ☐ No    edit Games/Video Games: click here    Choose: ☑ Yes  or  ☐ No    Choose: ☑ Make Public  or  ☐ Remain Anonymous Allow users to Inbox you about Games/Video Games: click here    Choose: ☑ Yes  or  ☐ No    edit Holiday Decorating: click here    Choose: ☑ Yes  or  ☐ No    Choose: ☑ Make Public  or  ☐ Remain Anonymous Allow users to Inbox you about Holiday Decorating: click here    Choose: ☑ Yes  or  ☐ No    edit

FIG. 5G

Street Interests Section

Households interested in:

Garage Sales:

StreetOpps User: Nancy Thomas
Inbox StreetOpps User about Garage Sales: Not Available StreetOpps User: Anonymous
Inbox StreetOpps User about Garage Sales: click here StreetOpps User: Anonymous
Inbox StreetOpps User about Garage Sales: Not Available StreetOpps User: MBlakeslee
Inbox StreetOpps User about Garage Sales: click here StreetOpps User: Anonymous
Inbox StreetOpps User about Garage Sales: click here StreetOpps User: Phil Mickelson
Inbox StreetOpps User about Garage Sales: Not Available StreetOpps User: Ricky Fowler
Inbox StreetOpps User about Garage Sales: click here

FIG. 10B

UserName: NBlakeslee
Company Name: Relph Benefit Advisors
Title: Associate Director of Business Development
Description: Large Group Insurance Broker for Benefits
Website: www.relphbenefitadvisors.com
Industry: Insurance
Inbox StreetOpps User about their company: click here

FIG. 10C

LOCATION-DRIVEN SOCIAL NETWORKING SYSTEM AND METHOD

FIELD OF INVENTION

The invention relates generally to a subscription-based social networking system/service that utilizes location services and advanced privacy controls.

BACKGROUND OF INVENTION

Despite the prevalence of transacting business online, networking is still a powerful tool to discover new opportunities, including jobs, restaurants, recreational activities, etc. Many times individuals associated with certain types of companies or activities will live near a person who might have an interest in these companies of activities, but the individuals may never make this connection. For example, it is very likely that a given individual would be unaware that he or she is living in the same neighborhood as a potential client, what companies employ his or her neighbors, whether the neighbors are proprietors of business from which this individual could benefit (e.g., a snowplow service, driveway sealer, landscape company, an exterminator), and/or whether his or her neighbors share common interests with the individual, including pets and hobbies. Having this type information regarding a given proximate geographic area could be potentially beneficial in a number of personal as well as business contexts. For example, a real estate agent may wish to gain a better view of the demographics of a neighborhood when selling a house to a potential buyer, a business owner may wish to promote his or her business efficiently (in a targeted manner) to individuals who may have an interest based one known demographic information, a municipality and/or private individual may wish to promote an event (e.g., a community event, garage sale, estate sale, neighborhood fundraiser, and/or sports tailgate party) in a manner that would appeal to potential attendees and, potentially, only to those attendees who would have an interest. A stumbling block to making this type of information readily available is the privacy concerns of those to whom the information belongs as coupling personal attributes with the location of a person with those attributes could compromise the privacy, and, arguably, the safety, of the individual.

SUMMARY OF INVENTION

Shortcomings of the prior art are also overcome and additional advantages are provided through the provision of a method for providing secure location-sensitive data, the method includes, for example: generating, by one or more processor, a graphical user interface, on a client computing node, where the one or more processor communicates with the client computing node via an Internet connection; obtaining, by the one or more processor, over the Internet connection, user data from a client via entry by the client in the graphical user interface, wherein the user data comprises attributes of the user and privacy selections related to the attributes; utilizing, by the one or more processor, location services in the client computing node to obtain location information from the client computing node indicating a position of the client computing node; based on the obtaining, determining, by the one or more processor, a geographic segment for the client computing node, wherein the geographic segment represents a pre-defined geographic area, wherein the pre-defined geographic area comprises the position of the client computing node; and displaying, by the one or more processor, in the graphical user interface, by the one or more processor, based on the attributes of the user and the assigned geographic segment, a portion of attributes associated with at least one other user, wherein the at least one other user is associated with the geographic segment.

Systems, methods, and computer program products relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawing.

FIG. 3 is a workflow depicting aspects of an embodiment of the present invention.

FIGS. 5A-5G are registration pages of an embodiment of the present invention.

FIGS. 10A-10C illustrate aspects of certain embodiments of the present invention.

DETAILED DESCRIPTION OF THE INVENTION

Figure 1:
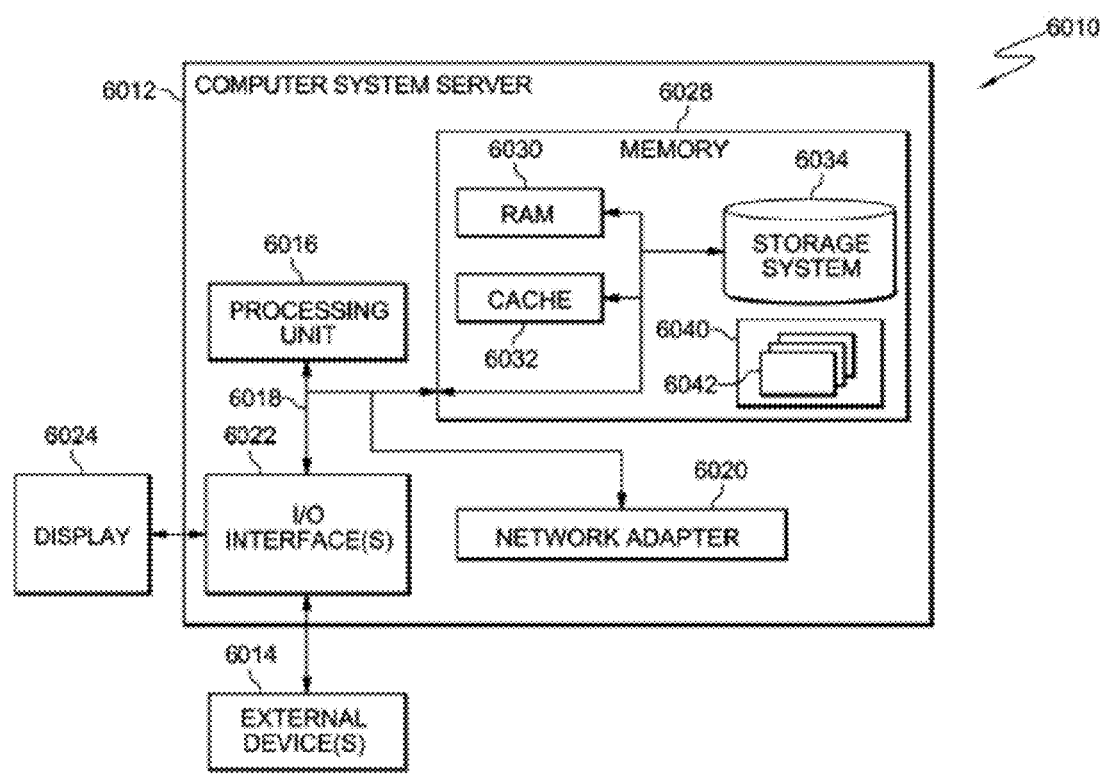
FIG. 1 depicts an embodiment of a computing node that may be utilized in an embodiment of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software, program code, and computer code are used interchangeably throughout this application. Program code may comprise one or more programs executed by one or more processor of a computing system.

Embodiments of the present invention include a subscription-based social networking software/service application that utilizes computer-based location services to situate a user within a given geographic zone. In an embodiment of the present invention, based on the geographic zone of the user, this user can see information related to other users of the subscription-based social networking software application within a defined area of the geographic zone. Thus, the user may only access the information of subscribers within a given geographic vicinity of the user. The program code may delineate the geographic zone of the initial user and on various parameters, such as the membership level of the user in the social networking software/service. An embodiment of the present inventions includes privacy protections as to the type of information that the user may access related to other users within his/her defined area is determined by the type of information these users chose to share by utilizing the privacy settings within the application. Embodiments of the present invention can dynamically adjust to changes in a location of a user by determining a new location for a user when this subscriber accesses the service/software using a mobile device. At this time, the program code may adjust the geographic zone and the defined area, enabling the user to access the information of subscribers in an area adjacent to the new location of the user.

In an embodiment of the present invention, a user may select a broad geographic area, such as a street through a global positioning system (GPS) enabled interface and based on this receiving this selection, program code executing on at least one processor on a computing node will configure and display aggregate data to the user related to users of the software with the selected street as a location attribute. For example, the program code may display aggregate (e.g., non-personally identifiable information), including but not limited to, companies, demographics, length of time on street, and/or interests associated with users associated with this street. The program code displays only the information the users enabled for display, upon entry or upon later manipulation of privacy settings.

In an embodiment of the present invention, the program code assigns each user to a defined geographic area, such as a street, based on the location of the user, and based on that street assignment, the user may select a group of additional defined geographic areas, which are within a certain proximity of the assigned street, upon which to receive data from the program code. The selected group and the assigned street may be referred to as a "Street Collection" of a user. Within a user's Street Collection, the user cannot only review content posted by other user, the user may also post to an informational feed that can be referred to as a "Street Feed," for a specific street, or to all or selected streets in that user's Street Collection. The user may also send event invitations to users assigned to the streets within the user's Street Collection. To add a given street to a user's Street Collection, a user will type in a street name that the program code has determined is accessible to the user based on the location of the user, and will view data of that given street (e.g., companies represented, interests, demographics and events). The user will be able to see how many users are on a given street along with the data they provided, or chose not to provide, within the categories. The user may then decide if the user would like to add this specific street to the Street Collection. When a user registers to participate in this software/service, the program code adds user's data to that of other users assigned to the same street. A user may add or delete streets from the user's Street Collection. However, the program code controls what streets a user may view, for possible addition to the Street Collection. Embodiments of the present invention serve to make registered users aware, based on the Street Collection of the user, of attributes of other users assigned to the streets in the Street Collection, including associated companies, demographics, interests and length of time users have been on a street.

Aspects of certain embodiments of the present invention include improvements to computing technology by utilizing location services in a mobile computing device in a unique manner to allow for the efficient discovery of geographically relevant information couple with the protection of person information, based on these location services. Data plans associated with mobile devices can be limited and when a user performs queries, especially in social networking applications, he or she runs the risk of exhausting his or her data plan, as well as utilizing an unnecessary amount of the finite resources that comprise a computer system and diminishing resource availability as a whole, to execute queries that result in data that is not relevant to the user. The user of the location services narrows the data accessible to the mobile device and therefore limits the resources that this device will utilize. These limitations benefit both the user individually and the system as a whole. Thus, embodiments of the present invention represent an advance in computing technology.

Embodiments of the present invention address issues that are specific to a computing technology because they provide represent improvement to social networking, which is a computing technology. Embodiments of the present invention provide a novel approach to social networking that enables users to obtain targeted, geographically relevant, data, without compromising privacy. Data privacy is an issue that is unique to computing technology and embodiments of the present invention include privacy controls that enable the program code to disseminate relevant information to registered users while allowing these registered users to control the nature and content of the information shared, as well as utilizing communications with mobile devices utilized by users over communications connection, including for example, the Internet to limit further the information available to each user. For example, in an embodiment of the present invention, the program code does not solicit or obtain confidential information related to its users. For example, in an embodiment of the present invention, the program code may not retain personal information (e.g., name, address, email, phone number, birthday, family information), but instead solicits and processes broad and general information that users can access as aggregate data, based on user proximity. For example, the program code may aggregate and present data on a street by street basis, but only to those users within a certain geographic proximity to at least one of the streets. Additionally, the program code provides a graphical user interface that users may utilize to change profile information at any time, including designating the privacy level of various attribute included in the profile (e.g., public, private). In an embodiment of the present invention, information that the user designates as private is not made available by the program code for other users to view or provide feedback. Embodiments of the present invention also provide privacy protections by limiting the aggregate data available to a given user based on the geographic location of the sources (other users) of the data that comprises this aggregate data. For example, in an embodiment of the present invention, the program code may limit a user at a given location from viewing aggregate data related to individuals who are not associated with locations within a given radius of the given location.

Embodiments of the present invention provide advantages over known social networking applications based on the program code aggregating and displaying data to a user in a manner that guards the privacy of other users of the application, while still providing accurate and useable information. In an embodiment of the present invention, based on user preference, the program code aggregates and configures data for viewing based on attributes and preferences of the user established by a user profile of the user. For example, a user may utilize views of aggregate data to determine if a given circumstance exists among in the population of a given geographic area, e.g., a street. A circumstance may include, but is not limited to a potential job opportunity, a new client, an individual with a similar interest, an individual with a similar demographic and/or length of time on a street. A user may select links on an aggregate display to view more granular detail. Whether a user can view granular detail about a given individual included in the aggregate data is based on the privacy settings of the individual.

The present invention may be a system, a method, and/or a computer program product. As understood by one of skill in the art, aspects of the present invention can be implemented on one or more nodes of a computing system, which can optionally include one or more nodes of a cloud computing environment. As understood by one or skill in the art, program code in embodiments of the present invention may be installed locally on a computing node and executed by a local processor and/or executed on a computing node accessed by another node over a communications connection. The program code may be deployed as a service. FIG. 1 depicts an embodiment of a computing node that may include a server or other computing resource in a system into which aspects of the present invention are implemented. Referring now to FIG. 1, a schematic of an example of a computing node is shown. Computing node 6010 is only one example of a suitable computing node and is not intended to suggest any limitation as to the scope of use or functionality of embodiments of the invention described herein. Regardless, computing node 6010 is capable of being implemented and/or performing any of the functionality set forth hereinabove.

In computing node 6010, there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions (referred to also as program code), such as program modules, being executed by a computer system. Generally, program modules may include routines, programs, objects, components, logic, data structures, and so on that perform particular tasks or implement particular abstract data types. Computer system/server 6012 may be practiced in distributed computing environments where tasks are performed by remote processing devices that are linked through a communications network. In a distributed environment, program modules may be located in both local and remote computer system storage media including memory storage devices.

As shown in FIG. 1, computer system/server 6012 in computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

A cloud computing environment, which is mentioned herein as comprising portions of a technical architecture into which aspects of the present invention may be implemented, may be comprised of one or more computing nodes 6010.

Figure 2:
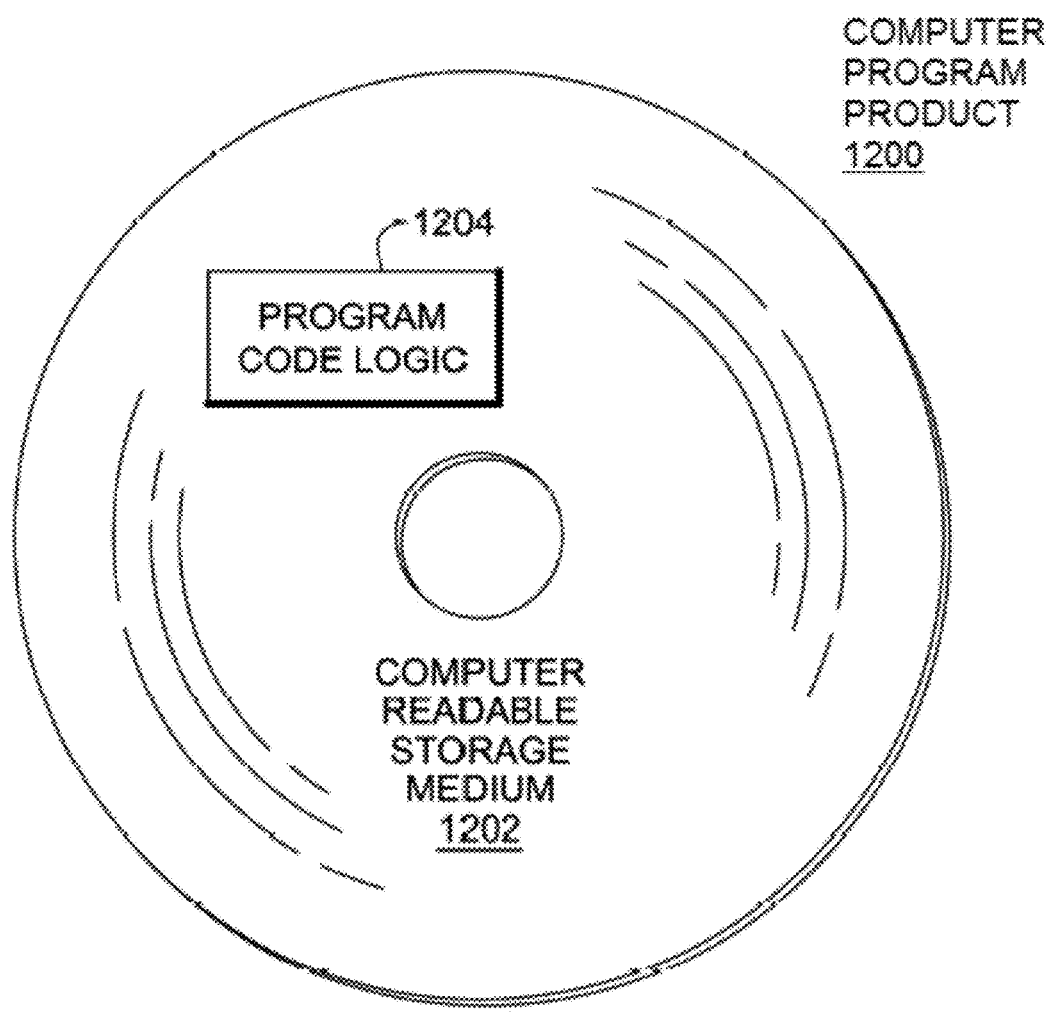
FIG. 2 depicts a computer program product that may be utilized in an embodiment of the present invention.

The computer program product may include a computer readable storage medium (or media) having computer readable program instructions thereon for causing a processor to carry out aspects of the present invention. Referring to FIG. 2, in one example, a computer program product 1200 includes, for instance, one or more non-transitory computer readable storage media 1202 to store computer readable program code means, logic and/or instructions 1204 thereon to provide and facilitate one or more embodiments. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Certain workflows of aspects of certain embodiments of the present invention are described in more detail in the figures that follow. However, referring to FIG. 1, one or more computing nodes 6010 may be utilized in the implementation of an embodiment of the present invention in a computer system. For example, in an embodiment of the present invention, program code that identifies and displays like attributes between individuals within a defined geographic proximity may reside on a web server; computing node 6010 is an example of the technical architecture of this web server. In this example, the program code that identifies the similarities may reside as a program/utility 6040 in memory 6028.

A user who wishes to interact with the program code executed, for example, by the processing unit 6016 on a web server, may connect to the web server using a personal computing device that may utilize architecture that is also similar to that of computing node 6010. Of course, in a personal computing device, such as a smartphone or tablet, the display 6024 may be integrated into the body of the device. Some of the program code that performs aspects of the present invention may also reside as the program/utility 6040 in memory 6028 on the personal computing device. The personal computing device may connect to the web server over a communications connection, including but not limited to a virtual private network and/or the Internet.

FIG. 3 depicts a workflow diagram of certain aspects of an embodiment of the present invention. In an embodiment of the present invention, program code generates a graphical user interface (GUI) on a display of a computing node utilized by a user to solicit a registration from the user and obtains registration information from the user via the GUI (310). Users who register create profiles including attributes, which the program code obtains. Users who register may be individuals or organizations. As part of the registration process, a user will designate each element/attribute as public or anonymous. The program code utilizes these granular privacy controls when displaying the aforementioned aggregate information and also, more detailed information, to users of the software.

Figure 4:
FIG. 4 is an illustration of a portion of a graphical user interface that is an aspect of an embodiment of the present invention.

FIG. 4 is an example of the GUI that the program code may generate so that the user can register. As seen in FIG. 4, a user (company and/or individual) registers by creating a username and password to sign in, both of which the user will utilize to sign into the application. In an embodiment of the present invention, users have the option of registering, but selecting an option not to display their usernames to other users, in which case the program code will display the user as "Anonymous" when displaying results. Example attributes that a user provides to the program code may include, but are not limited to, company, interests and demographics. In an embodiment of the present invention, the program code aggregates and provide data to user based on various geographical segments, including but not limited to, streets. The geographical segment of a street is utilized throughout as an example of one possible delineation that can be utilized. However, as understood by one of skill in the art, the program code may segment data by various geographical segments with the intent of limiting the information available about a given geographical segment to individuals within certain vicinities of the segment.

As aforementioned, the privacy of data is central to certain embodiments of the present invention, to this end, as seen in FIG. 4, when a user registers, the user does not provide and the program code does not receive any information related to the user, including but not limited to, home address, names, emails or telephone numbers. In addition to the aforementioned privacy controls, as seen in FIG. 4, a user may also designate, during registration, whether other users can communicate with this user, for example, by sending messages to a registered user's inbox within the framework of the application.

As understood by one of skill in the art, the program code in an embodiment of the present invention enables a user both the register through and to access a GUI to obtain information about other registered users within specific geographical segments without enabling another registered user to see this initial user's information through the GUI.

In an embodiment of the present invention, the program code utilizes the location services in a computing device utilized by the user to determine a location of the user (320). For example, the one or more program may access the global positioning system (GPS) capabilities within the computing node. As discussed earlier, in addition to user preferences and, in some embodiments of the present invention, subscription level, the one or more program may limit the information available to a user via the GUI based on the location of the user. Given that the program code solicits a location from a user in the GUI, and also obtains a location from the computing node itself, if the locations do not match, as a security measure, the program code may reject a user's registration and/or access to data of other users through the GUI. Returning to FIG. 4, in an embodiment of the present invention, the program code enables the user to select a "Street Search" input. When the user selects the "Street Search," the program code queries the location services in the mobile device utilized by the user to register. Based on the response of the location services, the one or more program obtains a location of the user and determines, based on this location, what geographic segment the location is a part of. The user is able to accept or reject the suggested segment, as seen in FIG. 4. In this figure, the geographic segment is a portion of street within a certain town and zipcode, and specifically, "Millington Terrace, Webster, N.Y. 14580." For ease of understanding, the geographic segment that the program code assigns a user to is referred to herein as the user's "Home Street."

In an embodiment of the present invention, once the program code receives and confirms the location of the user, the program code enables the user to configure parameters related to the user's profile that the program code will utilize to determine what information to display to the user (330). In an embodiment of the present invention, the user may indicate a preference to view categories of user information including but not limited to: Companies, Interests, Demographics or Create a Street Event. FIGS. 5A-5G are registration pages of an embodiment of the present invention that include examples of attributes that a user may be asked to populate as part of the registration process. As noted in the example, the user indicates the attributes and can indicate privacy preferences on a granular level. In FIGS. 5A-5G, attributes are separated into different sections merely to make these illustrations easy to follow and are not indicative of any required order or number of screens.

Figure 6A:
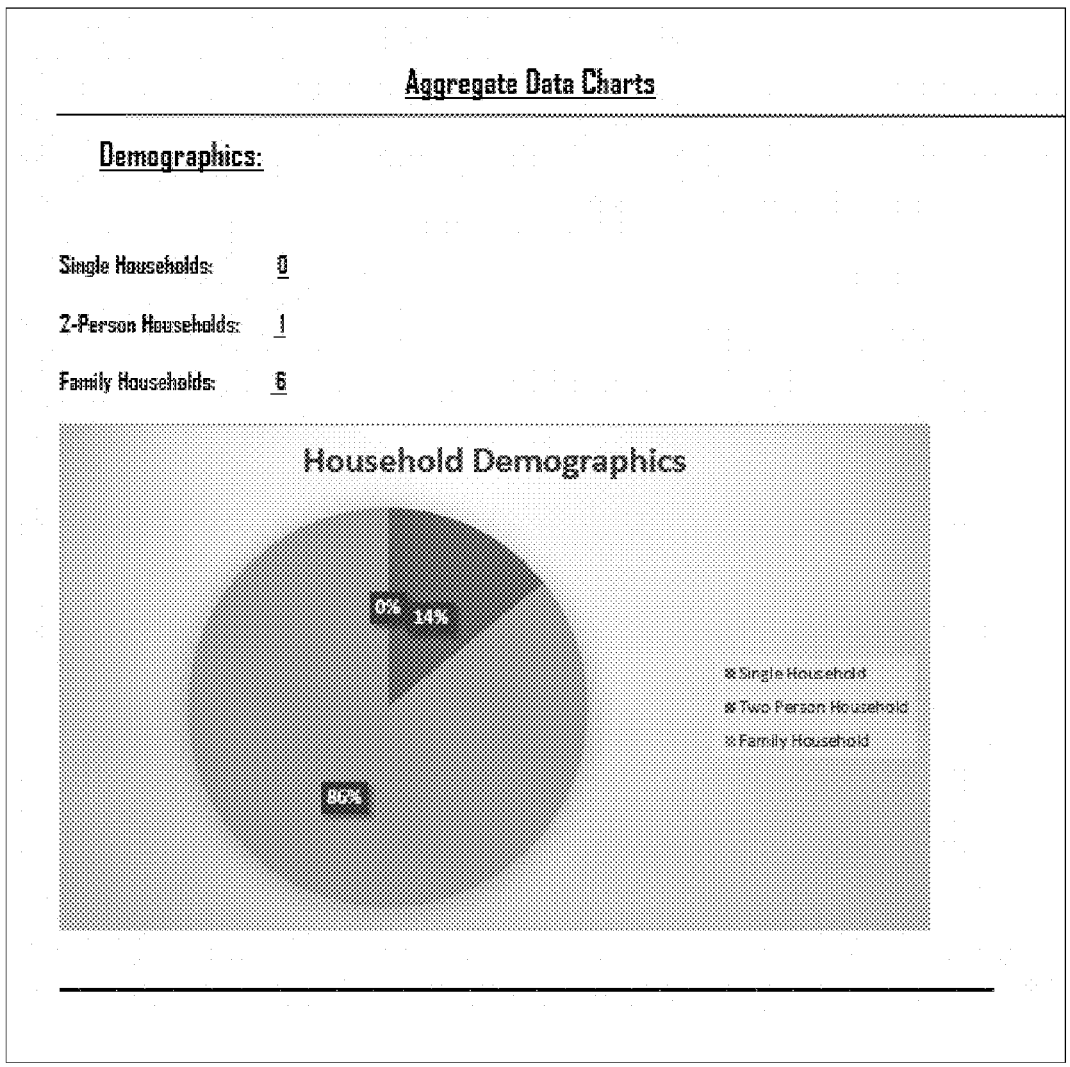
FIGS. 6A-6F are additional examples of displays of aggregate data compiled and rendered by embodiments of the present invention.
Figure 6B:
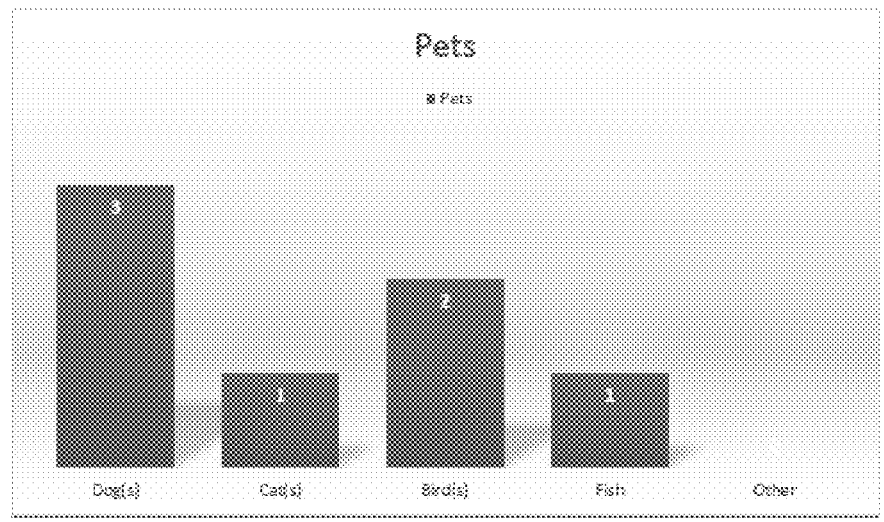
Figure 6C:
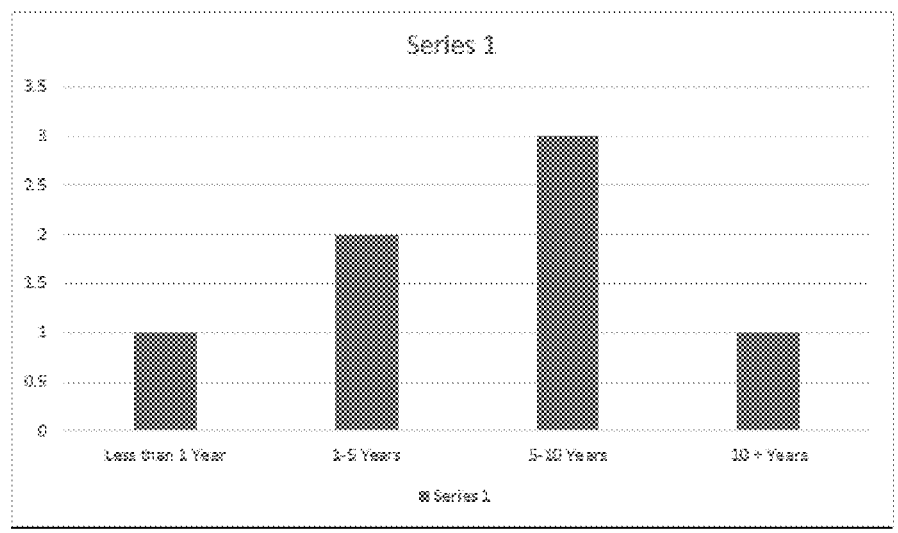
Figure 6D:
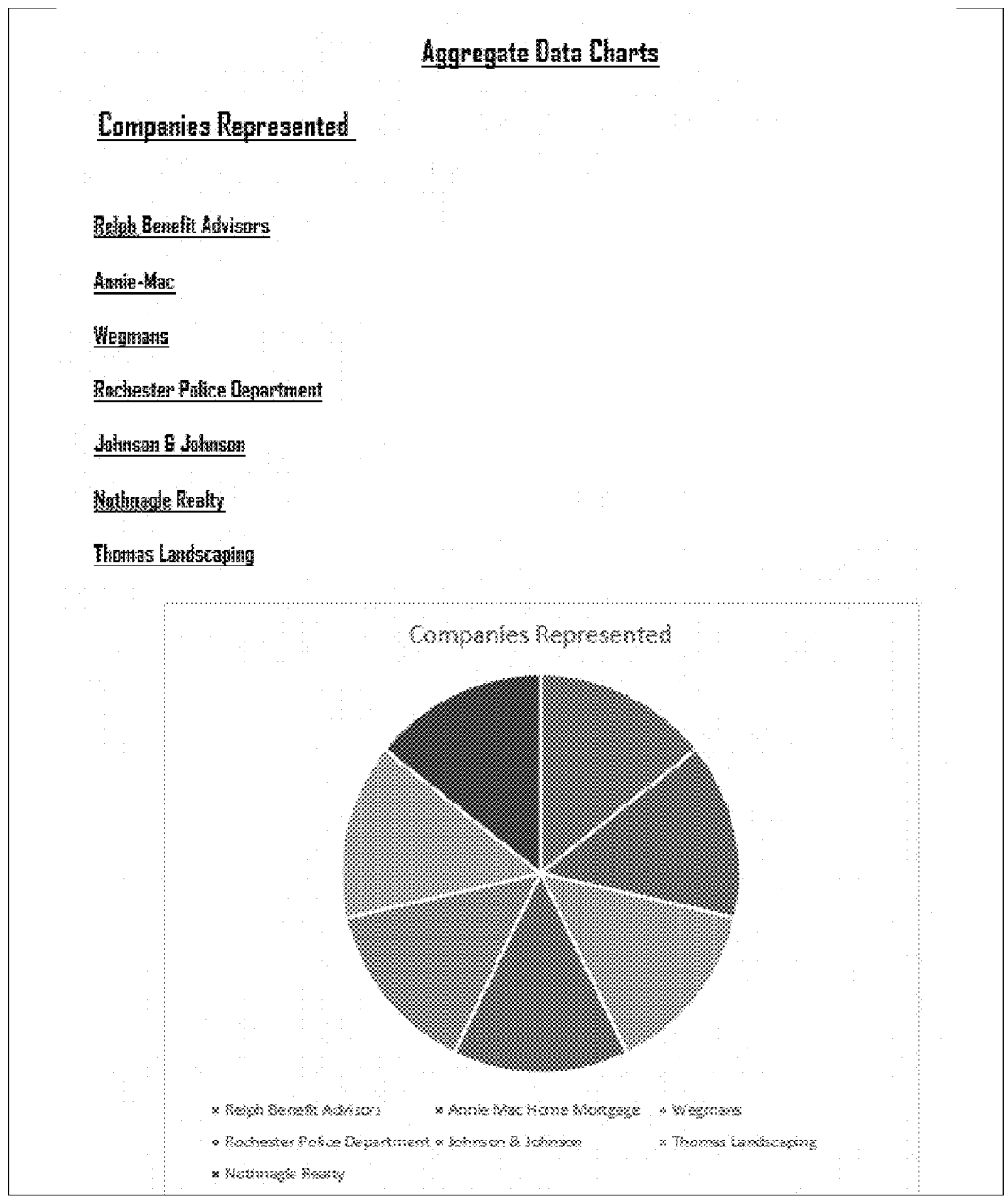
Figure 6E:
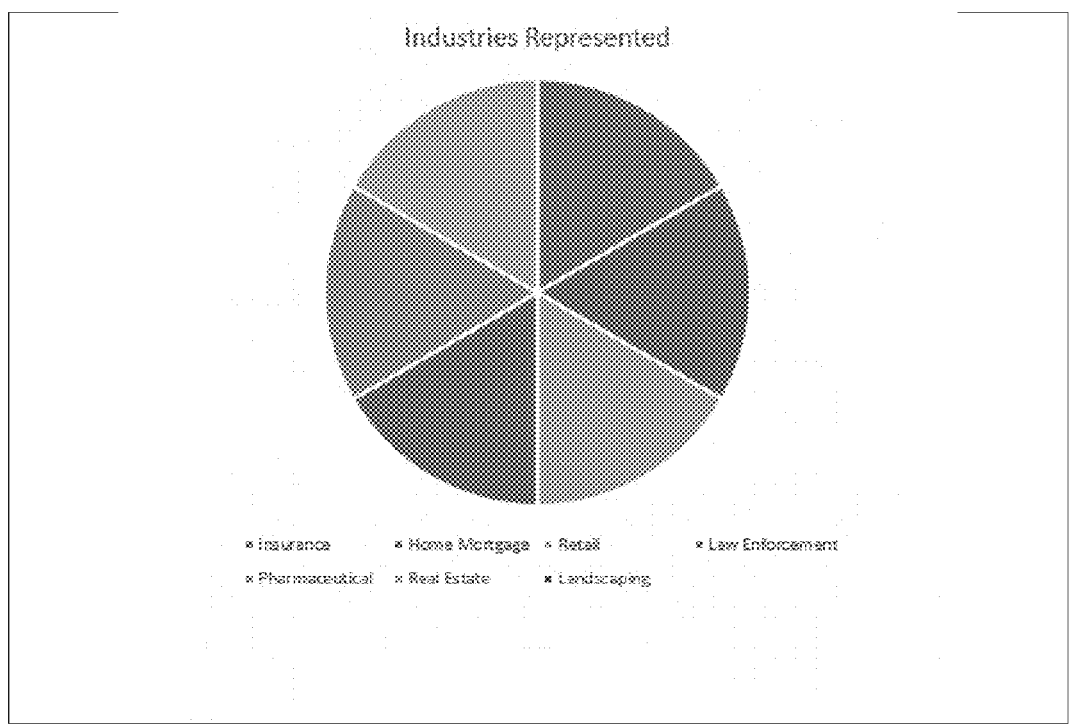
Figure 6F:
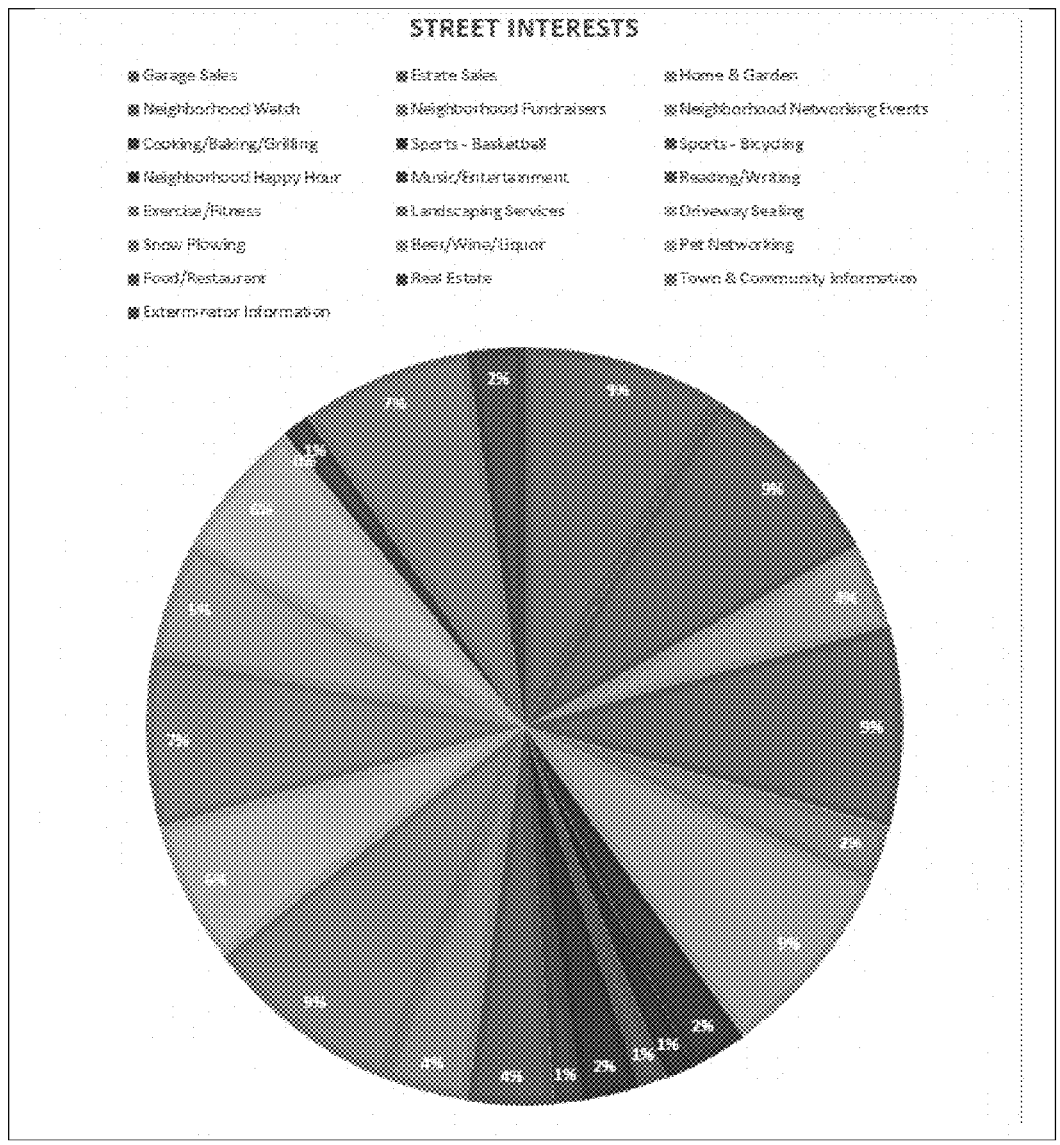

Returning to FIG. 3, based on confirming the location of the user, the program code assigns the user to a pre-defined geographic segment, for example, a street (340). As aforementioned, the one or more program does not display the exact location of a user and based on protecting the privacy of a user, assigns users to segments (e.g., streets) in order to aggregate the data of a user with other users in the same segment. FIG. 6 is an example of a display that the one or more program may utilize to display aggregate data to a user based on the user indicating certain categories. As seen in FIG. 6A, the user, who has access to data in a given geographic segment (e.g., street) view the data for that segment, in an aggregate form, that protects the privacy (and the exact locations) of the individuals who comprise the data. As seen in FIG. 6A, for the given geographical segment, there are no single households, 1 two-person households, and 6 family households. The user can click on the aggregated data to drill down into details that the users to whom to data pertains have made available through the privacy settings. FIGS. 6B-6F are additional examples of displays of aggregate data that a user may access, provided that the program code determined that the user may access data related to the geographic area represented. In these figures, the data represented is the aggregate data of users on a given street, as defined by the program code.

Figure 7:
FIG. 7 illustrates an aspect of certain embodiments of the present invention.

Returning to FIG. 3, as aforementioned, the location of a user enables the program code to determine what information the user may access. Thus, in an embodiment of the present invention, the program code displays a list of geographical segments to a user and obtains from the user a selection of those segments (350). In an embodiment of the present invention, the segments are streets. Based on a subscription level of the user, the program code may limit the number of streets that the individual may select. The program code may also enable the user to edit the selected streets and changes the selections, provided the selections are limited to the upper level determined by the subscription level. As illustrated by FIG. 7, in an embodiment of the present invention, a user is able to view the user's Street Collection and choose to click on a check box next to each street which enables the user to view information regarding each street, including but not limited to, aggregate data, as seen in FIGS. 6A-6G. As aforementioned, the program code determines whether to offer each geographic segment (e.g., street) as an option based on the assigned geographic segment of the user, which was based on the program code confirming the location of the user.

Returning to FIG. 7, the number of streets that the program code enables the user to add to the user's Street Collection may depend upon the subscription level of the user. In an embodiment of the present invention, if a user selects more streets, the program code may prompt the user to upgrade to a higher subscription level or to adjust the streets selected to a number that is allowed under the subscription. In an embodiment of the present invention, when a user first selects streets to include in a Street Collection, the program code may determine a corresponding subscription level for the number of streets selected and request and receive electronic payments from the user.

Figure 8:
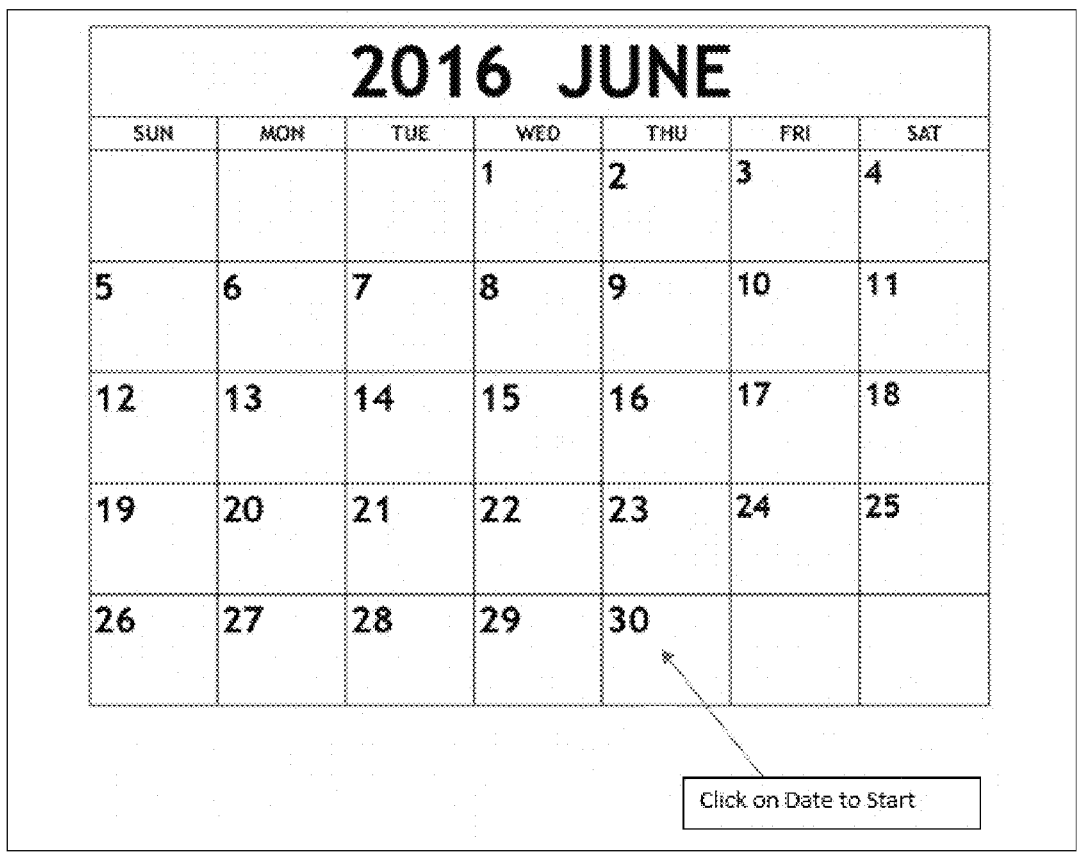
FIG. 8 illustrates an aspect of certain embodiments of the present invention.

In an embodiment of the present invention, a user may view and edit information related to a given street in a "Street Collection" by utilizing a tool called the Street Calendar, an example of which is shown in FIG. 8. The user may post an event to a calendar. For example, is a user wants to promote a garage sale on June 30th, the user can click on June 30th and complete the information below, which the program code will obtain. The can then click on the streets of the Street Collection to which the user wants to broadcast the June 30th Garage Sale, including the Home Street (i.e., the location confirmed by the program code), or every street in the collection. The event will then be on the Home Street Calendar to view by clicking on the date and also go to the Street Feed of those selected streets. The Street Feed is illustrated as FIG. 8.

Figure 9:
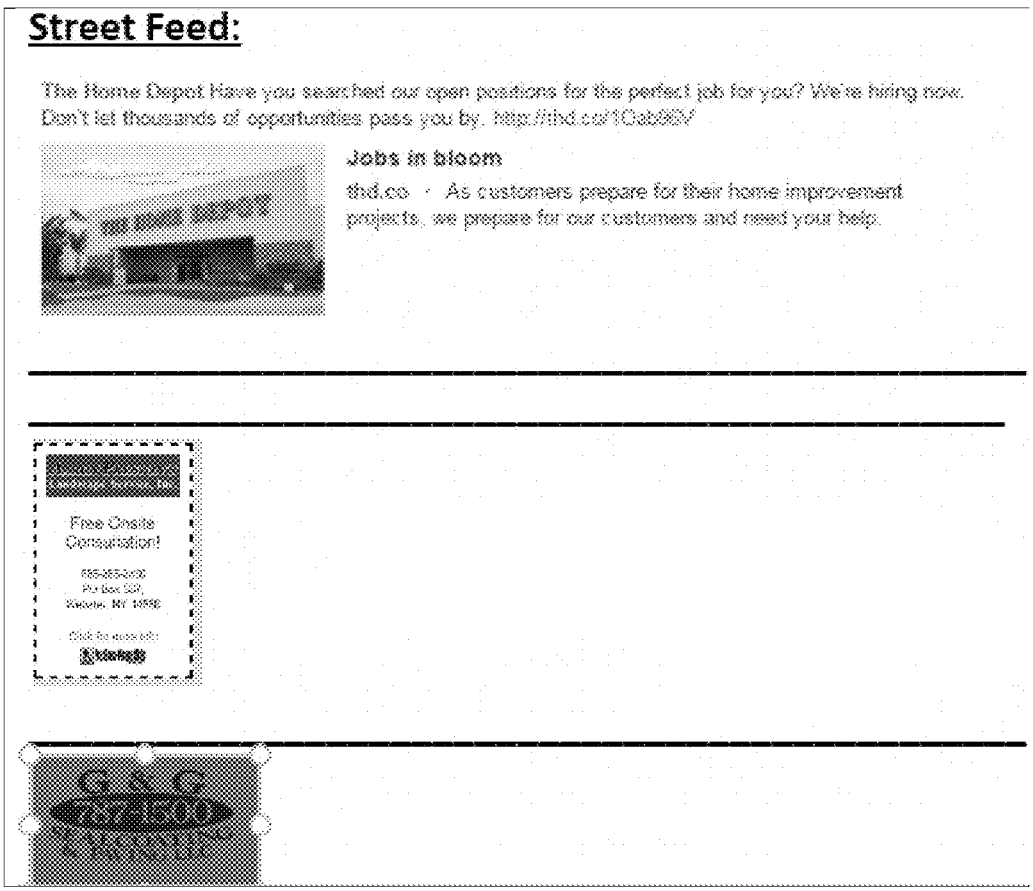
FIG. 9 illustrates an aspect of certain embodiments of the present invention.

In an embodiment of the present invention, users may post data to a GUI generated by the program code and the program code will render the data in a display, which can be referred to, in one example, as a "Street Feed." Street Feeds display information that users post to selected streets in their Street Collections. FIG. 9 is an example of a Street Feed. As seen in this figure, an advertisement for a job opening and some businesses have been posted by users.

Returning to FIG. 3, upon receiving the selections of the user, the program code aggregates and displays information related to users fitting the geographic segments selected to the user (360). In an embodiment of the present invention, the program code displays geographical information that is potentially useful to a registered user without risking the privacy of the additional registered users to which the displayed data pertains. To that end, in an embodiment of the present invention, the when a user views a street in the user's Street Collection, the user sees the Street Name, of another user, not a pinpoint specific location of a user because exact location or home address is not collected or displayed by the program code. When viewing a given street, a user may view information related to, for example, company, interests, demographics, length of time on street, and a Street Calendar, based on whether this information was made public by the entity that entered that information. Thus, the program code displays opportunities on a given street, the number of users associated with the given street and various characteristics that the users have made public, but not the personally identifiable information or exact location. The program code enables the user to select the displayed companies, demographics, interests and length of time on the street to see if the users associated with these individual items will allow this user to communicate through the application, for example, to request information regarding those topics. For example, in an embodiment of the present invention, through a privacy setting, one user may enable other users to message (e.g., inbox) the user regarding certain types of information. Embodiments of the present invention can encourage collaboration between neighbors for various resources. For example, a user may utilize an embodiment of the present invention to discover that a given number of people are interested in lawn services and provided that the individuals enable contact for these services, the user may contact these individuals through the application and coordinate a lawn service for the street, possibly taking advantage of discounts.

Figure 10A:
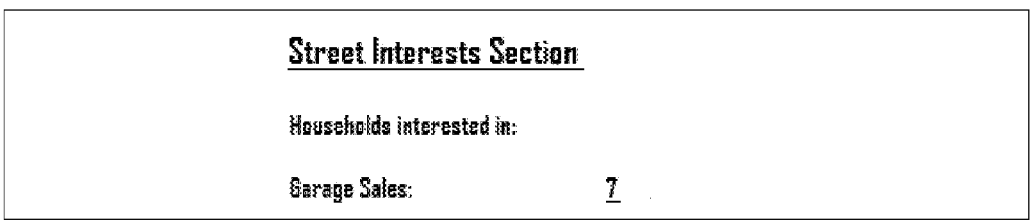

Returning to FIG. 5C, as discussed earlier, the privacy settings in an embodiment of the present invention are granular and enable a user to determine whether other viewers (who already have access to the geographic segment of this user) can view user information. In FIG. 5C, a user, e.g., MBlakeslee (as aforementioned, a username is also utilized to protect privacy), has indicated an interest in "Garage Sales" and enabled the program code to make the interest public (not anonymously so). This user has also indicated that other users may contact (e.g., Inbox) the user regarding Garage Sales. The privacy settings set by this user are utilized by the program code when displaying aggregate results to a user related to the geographic segment of this user. For example, FIG. 10A illustrates an example of aggregate data as displayed by the program code for the geographic segment (e.g., Street) as related to users assigned to this segment that have also expressed an interest in Garage Sales. The program code provides "7" as an aggregate of the number of users in this segment with this interest. As a user drills down into the granular details, he or she experiences the effects of the individual privacy controls on the display generated by the program code.

FIG. 10B is an example of an initial level of more granular data that a user with access to a given geographic segment may obtain by clicking on the aggregate provided by the program code. Specifically, the program code renders details in a GUI, such as those seen in FIG. 10B, when a user selects the "7" in FIG. 10A. The program code, responsive to the selection, retrieves and displays details of the seven (7) users who comprise that aggregate. As seen in FIG. 10B, based on the privacy controls that user MBlakeslee selected during registration for the interest Garage Sales, this user's name appears in this list, as opposed to being listed as Anonymous, and the user has the option of sending MBlakeslee a message (e.g., via Inbox). The privacy selections made by the user MBlakeslee can be contrasted with those made by certain of the other seven users listed. As seen in FIG. 10B, certain of the users have opted to remain anonymous but enables messaging while some assented to being included in the aggregate but have not consented to the program code displaying any additional user data.

FIG. 10C is an example of yet another level of granularity that is available in an embodiment of the present invention. The program code may generate a display in a GUI such as that in FIG. 10C when a user selects a displayed user from those listed in FIG. 10B that comprise the aggregate data in FIG. 10A. In this example, a user viewing a display like that in FIG. 10B, selects the user MBlakeslee and based on obtaining this selection, the program code retrieves and displays further details about the selected user. As seen in FIG. 5A, this user chose to make certain information available for display during the registration process. Thus, because during registration (or by subsequently editing the profile privacy settings) the user, MBlakeslee, made Company Name, Company Title, Company Description, Company Website, and Company Industry public, the program code enables the user selecting the username in a display such as that in FIG. 10B to access this information. Additionally, because in FIG. 5A, or an interface with similar functionality, this user has indicated that users with access to the user profile information may message (e.g., Inbox) the user, the program code provides authorized users with this option, as seen in FIG. 10C.

Users are not only limited by the program as to how many geographic segments (e.g., streets) they may view, they are also only able to post items, such as events, to the segments that the user has selected in the users Street Collection. For example, if a user wants to post information to the user of a specific street, the user must first have added that specific street to the user's Street Collection to post on the Street Feed or allow that specific street to view a Street Event the user posts on the Street Calendar.

In an embodiment of the present invention, the program code may continuously monitor the location of a mobile device being utilized by a user to interact with the program code, which may be running as a service on a server, for example, in a shared computing environment, such as a cloud. If the program code detects that the user's location has moved a pre-defined distance from the user's assigned location, the program code may prompt the user regarding whether the user wants to re-set his or her location. Should the user assent to resetting the location, the program code may assign the user to a new geographic segment (e.g., street) and enable the user to change his or her Street Collection selections. Additionally, in an embodiment of the present invention, a user may request to change his or her Home Street or other streets in the Street Collection based on changing location. In an embodiment of the present invention, before allowing the user to make this change, the program code confirms the location of the user with the location services (e.g., GPS) in the computing node the user has utilized to communicate with the program code, and based on the new location, assigns a Home Street and displays choices for the user's Street Collection. In an embodiment of the present invention, the program code may disable a user's access to streets in his or her street collection based on the program code determining that the user is outside a certain geographic radius.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Although various embodiments are described above, these are only examples. For example, computing environments of other architectures can be used to incorporate and use one or more embodiments. Further, different instructions, instruction formats, instruction fields and/or instruction values may be used. Yet further, although examples of values for abort codes and condition codes are provided, other values may be used. Moreover, different, other, and/or additional restrictions/constraints may be provided/used. Yet further, other intervals may be provided and/or used in differing ways. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or steps plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular uses contemplated.

The invention claimed is:

1. A computer-implemented method comprising:

generating, by one or more processor, a graphical user interface, on a client computing node, where the one or more processor communicates with the client computing node via an Internet connection;

obtaining, by the one or more processor, over the Internet connection, user data from a client via entry by the client in the graphical user interface, wherein the user data comprises attributes of the user and privacy selections related to the attributes;

utilizing, by the one or more processor, location services in the client computing node to obtain location information from the client computing node indicating a position of the client computing node;

based on the obtaining, determining, by the one or more processor, a geographic segment for the client computing node, wherein the geographic segment represents a pre-defined geographic area, wherein the pre-defined geographic area comprises the position of the client computing node;

displaying, by the one or more processor, in the graphical user interface, by the one or more processor, based on the attributes of the user and the assigned geographic segment, a portion of attributes associated with at least one other user, wherein the at least one other user is associated with the geographic segment;

based on determining the geographic segment, identifying, by the one or more processor, a plurality of geographic segments within a pre-defined geographic proximity to the geographic segment;

displaying, by the one or more processor, the plurality of geographic segments in the graphical user interface;

obtaining, by the one or more processor, responsive to the displaying, a selection of a portion of the geographic segments;

aggregating, by the one or more processor, data associated with each user in the geographic segment and in each geographic segment of the portion of the geographic segments, to create aggregate data models for the geographic segment and for each geographic segment of the selection of geographic segments;

displaying, by the one or more processor, in the graphical user interface, at least one aggregate data model of the aggregate data models;

determining, by the one or more processor, utilizing the location services in the client computing node, that the client is in a new position, wherein the new position differs from the position;

determining, by the one or more processor, a new geographic segment for the client computing node, wherein the new geographic segment represents a new pre-defined geographic area, wherein the new pre-defined geographic area comprises the new position of the client computing node;

displaying, by the one or more processor, through the graphical user interface, an option to select the new geographic segment or to retain the geographic segment;

obtaining, by the one or more processor, through the graphical user interface, a selection; and based on the selection, displaying, by the one or more processor, in the graphical user interface, by the one or more processor, based on the attributes of the user and the selected geographic segment, a portion of attributes associated with at least one other user, wherein the at least one other user is associated with the selected geographic segment.

2. The method of claim 1, further comprising:
based on the determining, selecting, by the one or more processor, at least one other geographic segment, wherein the at least one other geographic segment is within a pre-defined geographic proximity of the geographic segment for the client computing node, and associating the user with the geographic segment; and
displaying, by the one or more processor, in the graphical user interface, by the one or more processor, a portion of attributes associated with at least one user associated with the at least one other geographic segment.

3. The method of claim 1, further comprising:
monitoring, by the one or more processor, by communicating with the location services, the position of the client computing node to determine if a new position is outside of a pre-defined distance from the position; and
based on determining that the new position is outside of the pre-defined distance, determining, by the one or more processor, a new geographic segment for the client computing node, wherein the new geographic segment represents a pre-defined geographic area, wherein the pre-defined geographic area comprises the new position of the client computing node; and
displaying, by the one or more processor, in the graphical user interface, by the one or more processor, based on the attributes of the user and the assigned geographic segment, a portion of attributes associated with at least one additional user, wherein the at least one additional user is associated with the new geographic segment.

4. The method of claim 1, further comprising:
obtaining, by the one or more processor, through the graphical user interface, a request for granular information related to the portion of the attributes associated with at least one other user;
determining, by the one or more processor, whether the user has permission to view the granular information; and
based on determining that the user has permission, transmitting, by the one or more processor, over the Internet, and displaying in the graphical user interface, the granular information.

5. The method of claim 4, wherein the determining comprises:
communicating, by the one or more processor, with the location services, to obtain a current position of the client computing node; and
determining, by the one or more processor, that the current position is within a pre-defined distance from the position.

6. The method of claim 5, wherein the determining further comprises:
obtaining, by the one or more processor, privacy selections at least one other user related to each attribute of the attributes of the portion of the attributes associated with the granular information; and
determining, by the one or more processor, whether the user has permission to view the granular information based on the privacy selections.

7. The method of claim 1, further comprising:
based on obtaining the selected geographic segment, identifying, by the one or more processor, a plurality of additional geographic segments within a pre-defined geographic proximity to the selected geographic segment;
displaying, by the one or more processor, the plurality of additional geographic segments in the graphical user interface;
obtaining, by the one or more processor, responsive to the displaying, a selection of a portion of the additional geographic segments;
aggregating, by the one or more processor, data associated with each user in the selected geographic segment and in each additional geographic segment of the portion of the additional geographic segments, to create aggregate data models for the selected geographic segment and for each additional geographic segment of the selection of additional geographic segments; and
displaying, by the one or more processor, in the graphical user interface, at least one aggregate data model of the aggregate data models.

8. The method of claim 1, further comprising:
transmitting, by the one or more processor, a message from the user to the at least one additional user.

9. The method of claim 1, further comprising:
obtaining, from the at least one user, via the Internet, from at least one computing node utilized by the at least one user, a request for information of users assigned to the geographic segment;
aggregating, by the one or more processor, data associated with each user in the geographic segment to create an aggregate data models for the geographic segment, wherein the aggregate data model comprises attributes of the user; and
transmitting, by the one or more processor, to the at least one computing node utilized by the at least one user, the aggregate data model.

10. The method of claim 9, further comprising:
obtaining, from the at least one user, via the Internet, from at least one computing node utilized by the at least one user, a second request for granular information related to one attribute of the attributes of the user;
accessing, by the one or more processor, from the privacy selections related to the attributes, a privacy selection related to the one attribute to determine whether the at least one user may view the granular information; and
based on determining that the at least one user may view the granular information, transmitting, by the one or more processor, to the at least one computing node utilized by the at least one user, the granular information.

11. A computer program product comprising:
a computer readable storage medium readable by one or more processor and storing instructions for execution by the one or more processor for performing a method comprising:
generating, by the one or more processor, a graphical user interface, on a client computing node, where the one or more processor communicates with the client computing node via an Internet connection;
obtaining, by the one or more processor, over the Internet connection, user data from a client via entry by the client in the graphical user interface, wherein the user data comprises attributes of the user and privacy selections related to the attributes;
utilizing, by the one or more processor, location services in the client computing node to obtain location information from the client computing node indicating a position of the client computing node;
based on the obtaining, determining, by the one or more processor, a geographic segment for the client computing node, wherein the geographic segment represents a pre-defined geographic area, wherein the pre-defined geographic area comprises the position of the client computing node;
displaying, by the one or more processor, in the graphical user interface, by the one or more processor, based on the attributes of the user and the assigned geographic segment, a portion of attributes associated with at least one other user, wherein the at least one other user is associated with the geographic segment
based on determining the geographic segment, identifying, by the one or more processor, a plurality of geographic segments within a pre-defined geographic proximity to the geographic segment;
displaying, by the one or more processor, the plurality of geographic segments in the graphical user interface;
obtaining, by the one or more processor, responsive to the displaying, a selection of a portion of the geographic segments;
aggregating, by the one or more processor, data associated with each user in the geographic segment and in each geographic segment of the portion of the geographic segments, to create aggregate data models for the geographic segment and for each geographic segment of the selection of geographic segments;
displaying, by the one or more processor, in the graphical user interface, at least one aggregate data model of the aggregate data models;
determining, by the one or more processor, utilizing the location services in the client computing node, that the client is in a new position, wherein the new position differs from the position;
determining, by the one or more processor, a new geographic segment for the client computing node, wherein the new geographic segment represents a new pre-defined geographic area, wherein the new pre-defined geographic area comprises the new position of the client computing node;
displaying, by the one or more processor, through the graphical user interface, an option to select the new geographic segment or to retain the geographic segment;
obtaining, by the one or more processor, through the graphical user interface, a selection; and
based on the selection, displaying, by the one or more processor, in the graphical user interface, by the one or more processor, based on the attributes of the user and the selected geographic segment, a portion of attributes associated with at least one other user, wherein the at least one other user is associated with the selected geographic segment.

12. The computer program product of claim 11, further comprising:
based on the determining, selecting, by the one or more processor, at least one other geographic segment, wherein the at least one other geographic segment is within a pre-defined geographic proximity of the geographic segment for the client computing node, and associating the user with the geographic segment; and
displaying, by the one or more processor, in the graphical user interface, by the one or more processor, a portion of attributes associated with at least one user associated with the at least one other geographic segment.

13. The computer program product of claim 11, further comprising:
monitoring, by the one or more processor, by communicating with the location services, the position of the client computing node to determine if a new position is outside of a pre-defined distance from the position; and
based on determining that the new position is outside of the pre-defined distance, determining, by the one or more processor, a new geographic segment for the client computing node, wherein the new geographic segment represents a pre-defined geographic area, wherein the pre-defined geographic area comprises the new position of the client computing node; and
displaying, by the one or more processor, in the graphical user interface, by the one or more processor, based on the attributes of the user and the assigned geographic segment, a portion of attributes associated with at least one additional user, wherein the at least one additional user is associated with the new geographic segment.

14. The computer program product of claim 11, further comprising:
obtaining, by the one or more processor, through the graphical user interface, a request for granular information related to the portion of the attributes associated with at least one other user;
determining, by the one or more processor, whether the user has permission to view the granular information; and
based on determining that the user has permission, transmitting, by the one or more processor, over the Internet, and displaying in the graphical user interface, the granular information.

15. The computer program product of claim 14, wherein the determining comprises:
communicating, by the one or more processor, with the location services, to obtain a current position of the client computing node; and
determining, by the one or more processor, that the current position is within a pre-defined distance from the position.

16. The computer program product of claim 15, wherein the determining further comprises:
obtaining, by the one or more processor, privacy selections at least one other user related to each attribute of the attributes of the portion of the attributes associated with the granular information; and
determining, by the one or more processor, whether the user has permission to view the granular information based on the privacy selections.

17. The computer program product of claim 11, further comprising:
based on obtaining the selected geographic segment, identifying, by the one or more processor, a plurality of additional geographic segments within a pre-defined geographic proximity to the selected geographic segment;
displaying, by the one or more processor, the plurality of additional geographic segments in the graphical user interface;
obtaining, by the one or more processor, responsive to the displaying, a selection of a portion of the additional geographic segments;

aggregating, by the one or more processor, data associated with each user in the selected geographic segment and in each additional geographic segment of the portion of the additional geographic segments, to create aggregate data models for the selected geographic segment and for each additional geographic segment of the selection of additional geographic segments; and displaying, by the one or more processor, in the graphical user interface, at least one aggregate data model of the aggregate data models.

18. The computer program product of claim 11, further comprising:

transmitting, by the one or more processor, a message from the user to the at least one additional user.

19. A system comprising:

a memory;

one or more processor in communication with the memory; and program instructions executable by the one or more processor via the memory to perform a method, the method comprising:

generating, by one or more processor, a graphical user interface, on a client computing node, where the one or more processor communicates with the client computing node via an Internet connection;

obtaining, by the one or more processor, over the Internet connection, user data from a client via entry by the client in the graphical user interface, wherein the user data comprises attributes of the user and privacy selections related to the attributes;

utilizing, by the one or more processor, location services in the client computing node to obtain location information from the client computing node indicating a position of the client computing node;

based on the obtaining, determining, by the one or more processor, a geographic segment for the client computing node, wherein the geographic segment represents a pre-defined geographic area, wherein the pre-defined geographic area comprises the position of the client computing node;

displaying, by the one or more processor, in the graphical user interface, by the one or more processor, based on the attributes of the user and the assigned geographic segment, a portion of attributes associated with at least one other user, wherein the at least one other user is associated with the geographic segment;

based on determining the geographic segment, identifying, by the one or more processor, a plurality of geographic segments within a pre-defined geographic proximity to the geographic segment;

displaying, by the one or more processor, the plurality of geographic segments in the graphical user interface;

obtaining, by the one or more processor, responsive to the displaying, a selection of a portion of the geographic segments;

aggregating, by the one or more processor, data associated with each user in the geographic segment and in each geographic segment of the portion of the geographic segments, to create aggregate data models for the geographic segment and for each geographic segment of the selection of geographic segments;

displaying, by the one or more processor, in the graphical user interface, at least one aggregate data model of the aggregate data models;

determining, by the one or more processor, utilizing the location services in the client computing node, that the client is in a new position, wherein the new position differs from the position;

determining, by the one or more processor, a new geographic segment for the client computing node, wherein the new geographic segment represents a new pre-defined geographic area, wherein the new pre-defined geographic area comprises the new position of the client computing node;

displaying, by the one or more processor, through the graphical user interface, an option to select the new geographic segment or to retain the geographic segment;

obtaining, by the one or more processor, through the graphical user interface, a selection; and based on the selection, displaying, by the one or more processor, in the graphical user interface, by the one or more processor, based on the attributes of the user and the selected geographic segment, a portion of attributes associated with at least one other user, wherein the at least one other user is associated with the selected geographic segment.

20. The system of claim 19, the method further comprising:

based on the determining, selecting, by the one or more processor, at least one other geographic segment, wherein the at least one other geographic segment is within a pre-defined geographic proximity of the geographic segment for the client computing node, and associating the user with the geographic segment; and displaying, by the one or more processor, in the graphical user interface, by the one or more processor, a portion of attributes associated with at least one user associated with the at least one other geographic segment.

* * * * *